N. J. BUSBY.
TIRE TREAD.
APPLICATION FILED APR. 15, 1910.

993,222.

Patented May 23, 1911.

WITNESSES:
Edwin L. Yewell
E. W. Louden

INVENTOR:
Nahum Judson Busby
by Percy B. Hills
Atty

UNITED STATES PATENT OFFICE.

NAHUM JUDSON BUSBY, OF BOSTON, MASSACHUSETTS.

TIRE-TREAD.

993,222.

Specification of Letters Patent. Patented May 23, 1911.

Application filed April 15, 1910. Serial No. 555,659.

*To all whom it may concern:*

Be it known that I, NAHUM JUDSON BUSBY, a citizen of the United States, residing at Boston, in the county of Suffolk and State of Massachusetts, have invented new and useful Improvements in Tire-Treads, of which the following is a specification.

My invention relates to tread surfaces for tires, and has for its object to provide an improved construction of the same that will not only prolong the wear of the same, but will also materially reduce the cost thereof.

Figure 1:
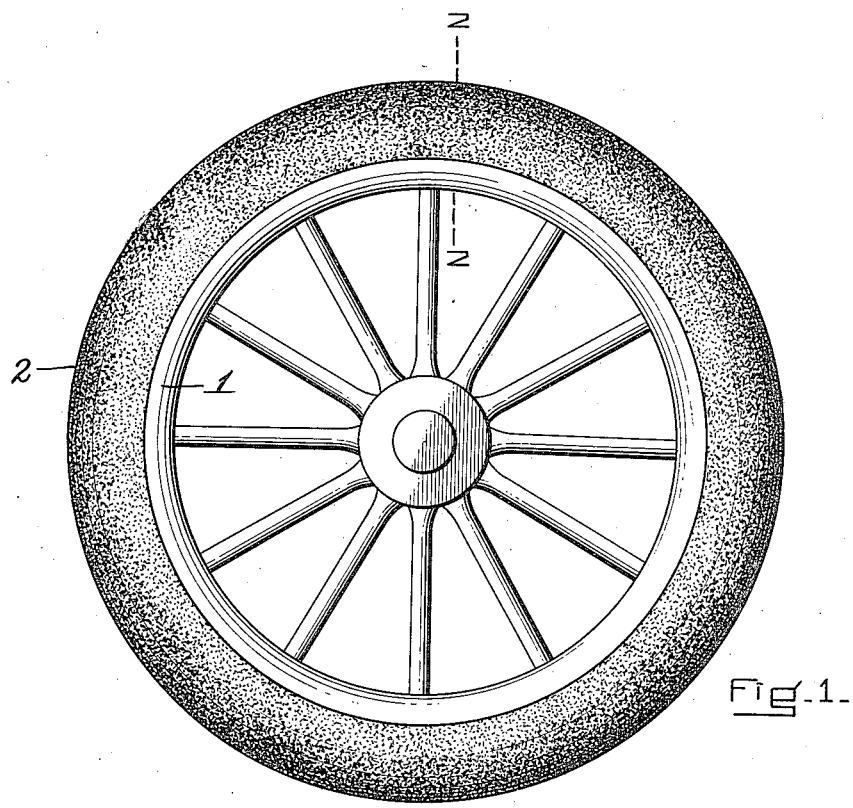
Figure 2:
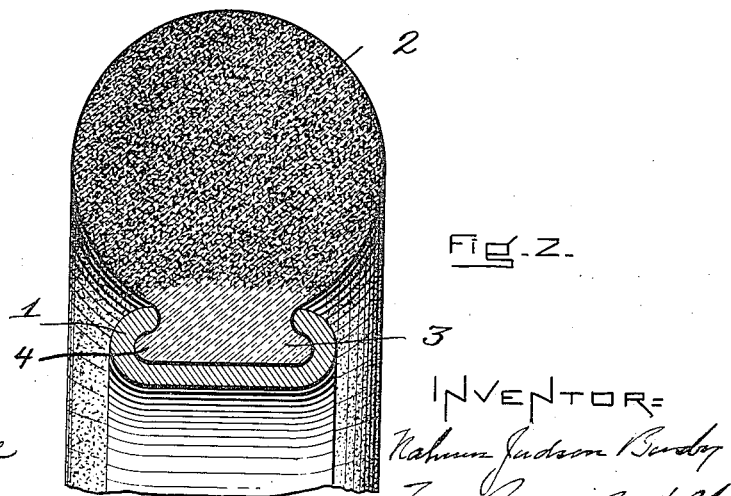

In the drawing Figure 1 is a side elevation of a wheel having a solid tire thereon formed of my improved material. Fig. 2 is an enlarged detail sectional view on the line 2—2 Fig. 1.

Specifically my invention embodies a tread for tires consisting of an admixture of quartz and elastic material, preferably rubber. By forming this admixture with a somewhat greater percentage of quartz than rubber a material reduction in the cost of a tire is obtained, as well as an increased resistance to wear without any material reduction in the resiliency.

In the drawing the reference numeral 1 shows the rim of a wheel, and 2 the tread portion of a solid tire thereon composed of an admixture of quartz and rubber as shown. As seen, in Fig. 2, the seat or base 3 of the tire where it is connected to the rim 1 is formed of solid rubber or its equivalent, no quartz entering into the construction at this point, which gives an increased resistance power to the tire when resting on the rim 1. It will also be observed by reference to Fig. 2 that the tread portion 2 and seat or base 3 are merged one into the other so that there is no defined line of demarcation between the two, the tire as a whole being formed in one homogeneous mass which is vulcanized at one operation. Said seat or base is also formed with integral flanges 4, whereby the tire may be more readily secured in position on the wheel.

While I have shown my invention composed of a solid tire, it will be understood that it is equally applicable to the tread surfaces of pneumatic tires.

I do not confine myself to any particular shape at the base of the tire for fastening the same on the wheel rim, as the same may be varied in any desired manner without departing from the spirit of my invention.

While I have described, and prefer to use, as my anti-slipping material quartz reduced to fragments of the required size, I wish it to be understood that I contemplate the use of any hard substance possessing quartz-like anti-slipping qualities.

Having thus described my invention, what I claim is new and desire to secure by Letters Patent is:—

An integral tire, comprising a main or body portion formed of an admixture of a quartz like substance and rubber, and a base composed wholly of rubber, said portions merged in a homogeneous body without a definite line of demarcation.

In testimony whereof I have hereunto set my hand in the presence of two subscribing witnesses.

NAHUM JUDSON BUSBY.

Witnesses:
NAHUM J. BUSBY, Jr.,
HIBBARD SPENCER BARTLETT CONOVER BUSBY.